June 18, 1940.   L. H. LEHMAN   2,204,862
MOUNTING FOR MIRRORS
Filed Dec. 10, 1937
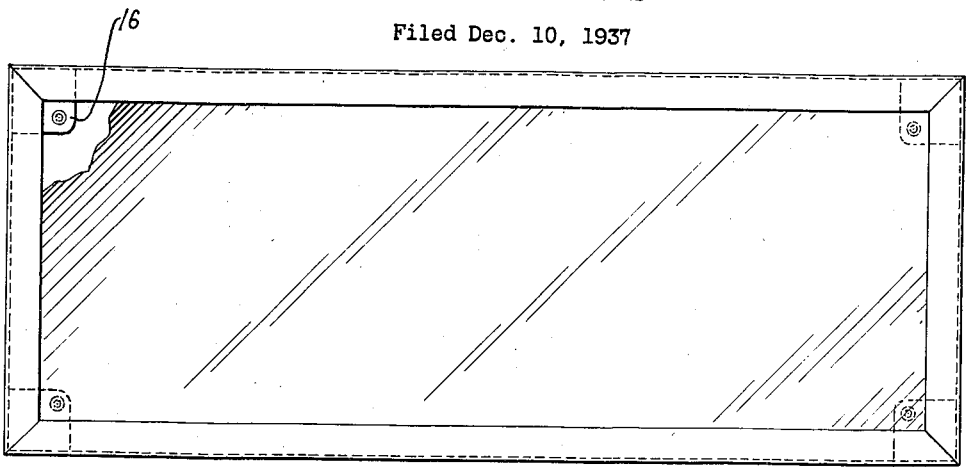
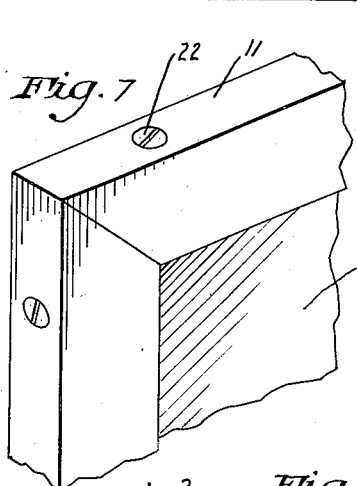
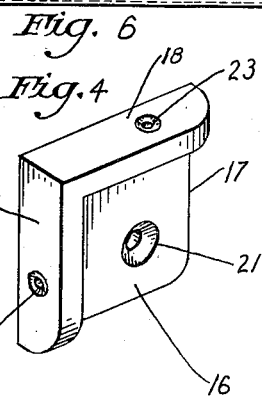
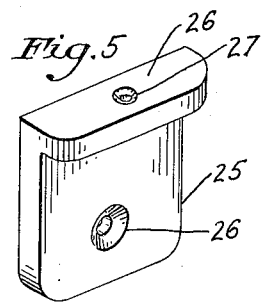
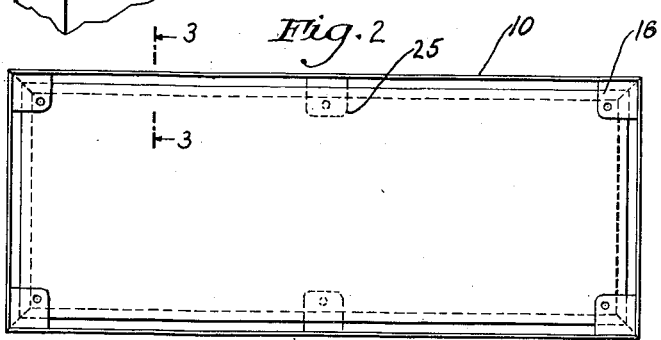
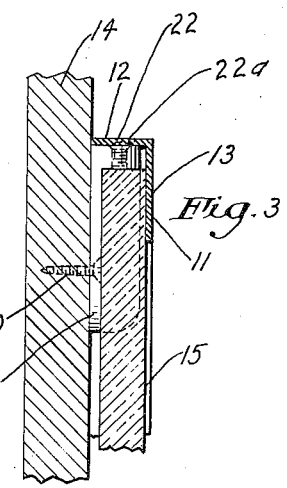
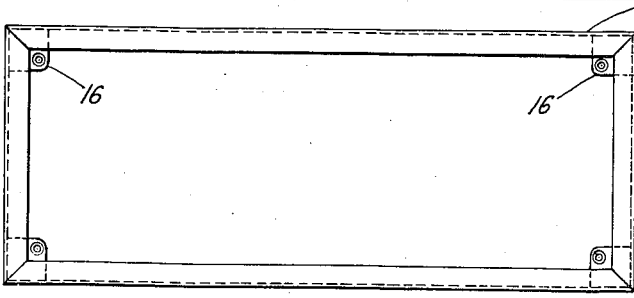
Inventor
LOUIS H. LEHMAN
By Lew Edelson
Attorney Patented June 18, 1940

2,204,862

UNITED STATES PATENT OFFICE 2,204,862

MOUNTING FOR MIRRORS

Louis H. Lehman, Philadelphia, Pa.

Application December 10, 1937, Serial No. 179,052

2 Claims. (Cl. 88—96)

This invention relates to a mounting frame for securing flat articles, such as glass mirrors, pictures or the like, upon a wall.

Heretofore, in mounting the mirrors or other articles upon a wall, it has been necessary to expose the connection between the mounting frame and the wall or to place the article being mounted at a distance from or at an angle with respect to the wall. It is among the objects of the present invention to provide a mounting frame for mirrors, pictures and the like in which the connection between the wall and mounting will not be visible when the article to be mounted is in position.

A further object of the present invention is to provide a mounting frame for securely and rigidly mounting heavy articles, such as plate glass mirrors, upon a wall or flat surface.

The invention still further provides a frame for mounting flat articles upon walls or flat surfaces which can be readily installed, which can be quickly and easily removed and the installation of which does not seriously mar or injure the wall or other flat surface to which it is secured.

Still further, I provide a sectionalized frame for mounting flat articles in a frame upon a wall or other flat surface which can be quickly and easily disassembled to replace or change the flat mounted articles, the several frame elements being so complementally formed that the securing devices for maintaining them in assembled relation and in fixed position upon the wall are not noticeable upon the front surface thereof.

Still further, it is among the objects of the present invention to provide a wall mounting frame of the class described which will embrace the desired features of simplicity and durability, and which may be manufactured and marketed at a minimum expense.

A still further and important object of the present invention is the provision of means for mounting glass mirrors upon walls without the possibility of damage to the glass mirror in the process of mounting, and which prevents the easy and quick removal of the mounted mirror by an unauthorized person.

Still another important object of the present invention is to provide a wall mounting frame of the class described in which the wall mounting elements are similar for mirrors of various sizes and in which the mirror retaining members are structurally similar, so that when one is furnished the requisite number of corner brackets (four in the case of a rectangular frame) he can assemble a frame the dimensions of which are limited only by the length of the frame members on hand.

Other objects and advantages of the invention will appear more fully hereinafter.

The invention consists substantially in the combination, construction and relative arrangement of parts, all as will appear more fully hereinafter, as shown in the accompanying drawing and as finally pointed out in the appended claims.

In the accompanying drawing, wherein have been illustrated a preferred embodiment of the invention:

Figure 1 is a front view of a frame for mounting flat articles on a wall constructed in accordance with and embodying the principles of the present invention;

Figure 2 is a rear view of Figure 1 with a mirror mounted in the frame;

Figure 3 is an enlarged cross-sectional view on the line 3—3 of Figure 2 showing the mounting frame secured to a wall;

Figure 4 is an enlarged perspective view of one of the corner brackets of the frame;

Figure 5 is an enlarged perspective view of one of the side brackets for the frame;

Figure 6 is a front view of Figure 2 with one corner of the mirror cut away to expose one of the corner brackets; and Figure 7 is an enlarged fragmental perspective view of a corner of the frame shown in Figure 6.

Referring now to the drawing it will be seen that the invention has been illustrated as being embodied in a frame for mounting upon a wall a rectangularly shaped glass mirror.

It will be observed that the mirror frame, designated generally by the reference numeral 10, is of rectangular shape in conformity to the shape of the mirror and is composed of four structurally similar right-angular side members 11, a typical cross-section of the frame being disclosed in Figure 3. The abutting ends of the structurally similar side members are complementally mitered, as shown in Figure 7, so that when assembled the frame is in conformity with the shape of the mirror.

The members 11 of the frame are relatively of such shape that when assembled as shown in Figures 1, 2 and 6, the horizontally disposed flanges 12 thereof are disposed in abutting relation to the wall surface 14, while the vertically disposed flanges 13 thereof are disposed in a plane parallel to the wall surface so as to overlap the marginal edges of the framed mirror 15.

The several members 11 of the frame are secured together at their respective ends, arranged so that the mitered edges are in abutting relation, by the corner brackets 16, while the latter in turn serve to secure the assembled frame to the wall. The corner brackets 16, which can be cast, pressed or molded of any suitably strong material, are three-sided and consist of a main flat body section 17 and two flange sections 18 and 19 disposed at right angles with respect to each other and to the body section 17. The brackets 16 are each adapted to be secured to the wall with the body section 17 thereof disposed in flatwise contact with the wall surface 14, said brackets 16 being so secured to the wall 14 by means of wood screws 20 projected through the countersunk aperture 21. It is, of course, understood that any type of wall securing element can be used in place of the screw 20 to secure the corner bracket 16 to the wall 14, as long as the securing element used has a conically shaped or countersunk head so that when installed the surface of the head of the securing element is flush with the exposed surface of the flat body section 17, so as to not mar or scratch the rear surface or protective backing of the mirror.

The abutting ends of the angle members 11 of the frame 10 are secured to the corner brackets 16 by means of the bolts 22. The said bolts 22 preferably have conically shaped heads to accommodate which the angle frame members 11 have countersunk apertures 22a and the flange sections 18 and 19 of the corner bracket members 16 respectively have complementally formed countersunk apertures 23 and 24 so that when the bolts 22 are inserted through the registered apertures the surfaces of the heads of the bolts 22 are flush with the outer surface of the angle members 11, as shown in Figures 3 and 7. It is, of course, understood that the last-mentioned flush surface is not a requisite of my invention but is preferable from the standpoint of appearance. Although any type of ornamental head can be used on the bolts 22, it may be advisable in certain instances to employ bolts having specially configured heads requiring special tools to remove and replace them.

The apertures 23 and 24 of the bracket flanges 18 and 19 are internally threaded and the length of the bolts 22 is such that when the bolts are projected through the said countersunk apertures 22a and threaded into the threaded apertures 23 and 24 so that the surface of the head of the bolt is flush with the exposed surface of the frame member, the end of the bolt does not project beyond the inner surface of the flange sections 18 or 19 of the corner bracket 16. This provision eliminates the possibility of the bolts chipping or cracking the edge of the framed mirror. It is thus seen that the angle members of the frame are rigidly and securely attached to each other and to the wall by the corner brackets 16. While the bolts 22 prevent lateral movement of the said angle members 11, the abutting complementally formed mitered corners of the angle members 11 prevent angular movement of the angle members with respect to each other and the corner brackets 16, thus assuring at all times a right angular relation between adjoining members of the frame as well as that the flanges 13 of said members lie in a common plane paralleling the wall.

Where additional bracing of the angle frame members 11 is required or where additional support of the mounted article is necessary between the corner brackets, side wall brackets, designated generally by the reference numeral 25, may be used. The side wall brackets 25 constructed substantially similar to the corner brackets 16 have, however, only a single flange 26 extending along one edge thereof. Similarly to the corner brackets 16, the side brackets 25 are secured to the wall through a countersunk aperture 26 by means of a wood screw similar to element 20, and to the angle frame member 11 by means of a bolt projected through a countersunk opening (not shown) provided in said angle member and into the threaded aperture 27 of the flange 26.

The procedure followed when installing a mirror to be wall-mounted in accordance with my invention is simple and does not require skilled labor. The corner and side wall brackets are first secured to the wall by means of the attaching elements 20, this being quickly and accurately accomplished by first assembling the angle frame members 11 on the brackets by means of the elements 22 and using the assembled frame as its own jig for locating the attaching holes 20. After securing the brackets to the wall, the angle members are removed, the mirror 15 is inserted within the flanges 18, 19 and 26 of the mounted brackets 17 and 25, and the angle frame members are then reassembled by securing them to the outer surfaces of the said flanges 18, 19 and 26 by means of the bolt elements 22. It is, therefore, apparent that the mirror is not inserted until after the wall brackets are secured to the wall, which eliminates the possibility of injury to the mirror when installing it, as is quite possible when the framed mirror itself must be secured to the wall.

When removing the mirror or when inserting a new mirror it is necessary to remove all of the angle frame members 11, as the protruding mirror-retaining flanges of the wall brackets, in conjunction with the relatively close fit of the glass mirror between the bracket flange 17 and the angle flange 13, will not allow the mirror to be removed when any of the frame members 11 are in place. When removing the frame for replacing the mirror, the wall connections are, therefore, not disturbed, which eliminates one possibility of a loose connection developing between the frame 10 and the wall on which it is mounted. When removing the wall mounting brackets from the wall, it is first necessary to remove the mirror as the elements 21 for securing the brackets to the wall are under the mirror and can only be reached by removing the mirror. It is, therefore, seen that the mirror frame and mounting cannot be bodily removed from the wall but must be completely disassembled before such removal is possible.

It will be observed that the brackets for all sizes of mirrors of any one shape are identical, and that the mirror frame members for all sizes of mirrors are structurally similar. This allows the manufactuer of such frames to produce a great variety of various sizes of frames while using only two structurally different members. By this invention, all that is necessary to construct a multiplicity of rectangular mirror frames of different sizes is to maintain in stock a number of pairs of different length frame members and a number of identical corner bracket members.

It will be understood, of course, that the invention is susceptible of various changes and modifications from time to time without departing from the real spirit or general principles thereof and it is accordingly intended to claim the same broadly, as well as specifically, as indicated by the appended claims.

What is claimed as new and useful is:

1. In a mounting frame for securing mirrors or other flat articles flatwise against a wall or the like, a peripheral frame composed of a plurality of separable frame elements adapted to be joined together to form a frame substantially in conformity with the shape of the mirror, each of said frame elements being of right-angular cross-section to provide a flange disposed in a plane paralleling the mirror and adapted to overlap the front marginal surface thereof and a flange extending transversely across the marginal edge of the mirror with the free edge of said latter flange adapted to abut against said wall, and means for securing the frame elements against the wall and in embracing relation to the mirror whereby the latter is maintained in mounted position upon the wall by said frame, said means consisting of a bracket comprising a flat body member and a pair of angularly related flanges respectively securable to the wall and to the transversely extending flange of a pair of adjoining frame elements, the flat body member of the bracket being of a depth greater than the depth of that flange of the mirror frame which parallels and overlaps the front marginal surface of the mirror and having an aperture so located as to permit the axial projection therethrough of a securing element for fastening the bracket to the wall while said frame and bracket are in assembled relation, whereby said frame and bracket assembly constitutes a jig for locating upon the wall the point at which the bracket is to be mounted.

2. In a mounting frame for securing mirrors or other flat articles flatwise against a wall or the like, a peripheral frame composed of a plurality of separable frame elements adapted to be joined together to form a frame substantially in conformity with the shape of the mirror, each of said frame elements being of right-angular cross-section to provide a flange disposed in a plane paralleling the mirror and adapted to overlap the front marginal surface thereof and a flange extending transversely across the marginal edge of the mirror with the free edge of said latter flange adapted to abut against said wall, and means for securing the frame elements against the wall and in embracing relation to the mirror whereby the latter is maintained in mounted position upon the wall by said frame, said means consisting of a bracket comprising a flat body member and a pair of angularly related flanges respectively securable to the wall and to the transversely extending flange of a pair of adjoining frame elements, the flat body member of the bracket being of a depth greater than the depth of that flange of the mirror frame which parallels and overlaps the front marginal surface of the mirror and having an aperture so located as to permit the axial projection therethrough of a securing element for fastening the bracket to the wall while said frame and bracket are in assembled relation, whereby said frame and bracket assembly constitutes a jig for locating upon the wall the point at which the bracket is to be mounted, said frame being bodily separable from said bracket either before or after the latter is fixedly secured to the wall at the pre-located point aforesaid and being adapted for resecurement to said bracket after the latter is secured to the wall at the pre-located point aforesaid with the mirror or like article embraced within said frame.

LOUIS H. LEHMAN.